(No Model.)
B. F. BURTNER.
Check Row Corn Planter.
No. 231,883. Patented Sept. 7, 1880.
FIG.1.
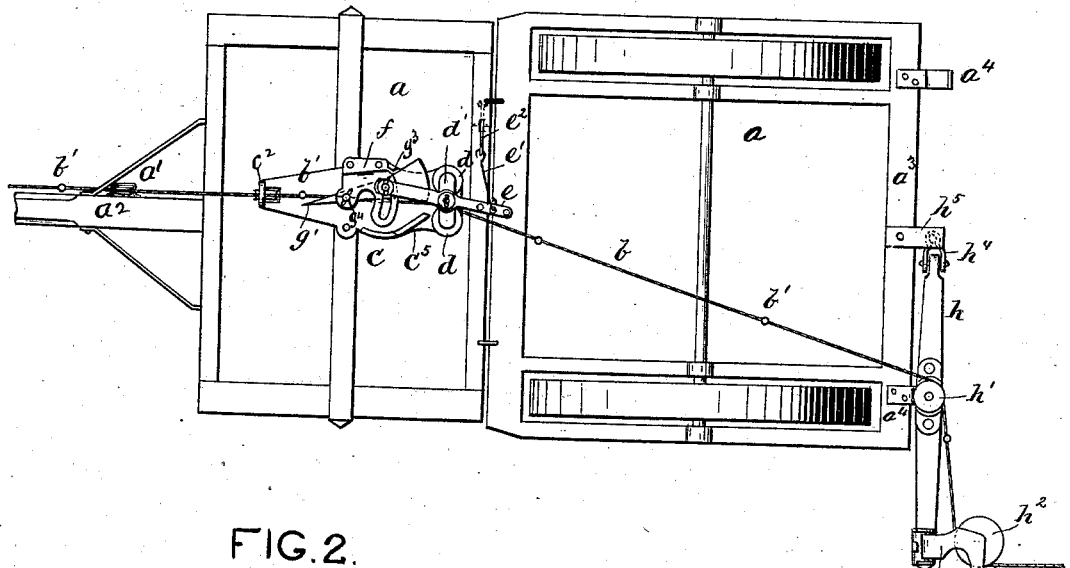
FIG.2.
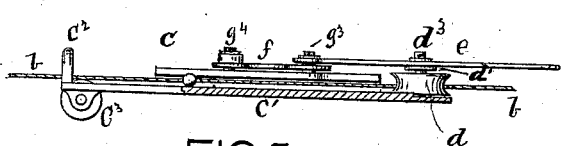
FIG.3.
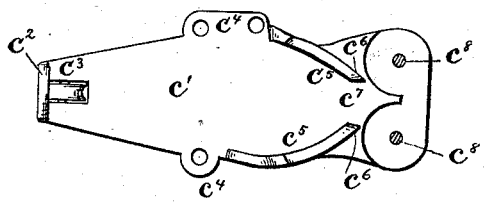
FIG.4.
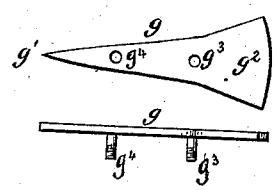
FIG.5.
FIG.6.
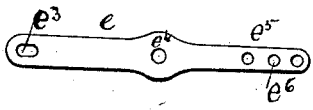
Witnesses:
Perry B. Turpin
M. M. Lacey
Inventor:
Benjamin F. Burtner
By R. S. & A. P. Lacey
Att'ys.

UNITED STATES PATENT OFFICE.

BENJAMIN F. BURTNER, OF TUSCOLA, ILLINOIS.

CHECK-ROW CORN-PLANTER.

SPECIFICATION forming part of Letters Patent No. 231,883, dated September 7, 1880.

Application filed April 5, 1880. (No model.)

*To all whom it may concern:*

Be it known that I, BENJAMIN F. BURTNER, a citizen of the United States, resident at Tuscola, in the county of Douglas and State of Illinois, have invented certain new and useful Improvements in Check-Row Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish a check-rowing device which may be easily applied to any ordinary corn-planter.

It consists of a base-plate with its forward and rear ends provided with guide-pulleys and loops or staples, combined with a casting or plate having its raised portion provided at its forward end with an eye and at the rear end with a curved slotted arm, a triangular-shaped cam pivoted at the eye portion of the plate last mentioned, and having a stud or pin projecting through the slotted arm of the said plate, knotted rope or wire, and seed-slide-operating lever connected to the stud of the cam, substantially as hereinafter more fully set forth.

In the drawings, Figure 1 is a plan of a corn-planter having my improvements attached thereto. Fig. 2 is a side elevation of my attachment, partially in section. Fig. 3 is a plan of the base-plate. Fig. 4 shows the conical lever, and Figs. 5 and 6 are detail views.

$a$ is a corn-planter frame of ordinary construction. $b$ is the check-row rope or wire which is stretched across the field, and has fixed on it the metallic knots or balls $b'$, arranged to give action at the proper moment to the dropping-slide, as hereinafter explained.

$c$ is the check-row attachment. $c'$ is the base-plate of the attachment. It is provided at its forward end with guide-loop $c^2$ and pulley $c^3$, arranged to direct the cord $b$ into the other mechanism of the attachment. It is provided with side lugs, $c^4$, or other suitable means whereby it can be bolted to the planter-frame. It has the two curved guide-ribs $c^5$ arranged at its rear end and having their points $c^6$ brought close together, so as to provide a narrow opening, $c^7$, immediately in front of and on a line passing between the guide-pulleys $d$ $d$ on the pins $c^8$. On the outer ends of the pins $c^8$, and above the pulleys, I affix a small cross-plate, $d'$, to which I pivot the lever $e$, which actuates the dropping-slide.

$f$ is an angle-plate, bolted at one side to the plate $c$, while its other side extends over and above the central line of the plate $c$, and it has the arm $f'$, in which is formed the slot $f^2$, and has also the lug $f^3$, to which is pivoted the conical lever $g$.

$g$ is a conical lever, which has its point $g'$ arranged toward and near to the guide-loop $c^2$ on the forward end of the plate, while its rear end extends near to the periphery of the pulleys $d$ $d$. It is pivoted to and on the under side of the lug $f^3$, so that its center of motion is on the central line of the plate running from the loop $c^2$ and between the pulleys $d$.

The lever $g$ has a to-and-fro movement on its pivot, which throws the point $g'$ first to one side and then to the other side of the central line above referred to. The same oscillating movement also throws the wider end $g^2$ alternately on opposite sides of said line, as will be clearly understood by reference to the drawings. The lever $g$ is not attached to the base $c'$, but the way is clear under it, so that the cord $b$ can move laterally and bring the knots $b'$ alternately to bear on opposite edges.

The dropping-lever $e$ is pivoted at or near its central point to the plate $d'$. Its forward end extends over the guide-slot $f^2$, and is pivoted on a pin, $g^3$, which projects from the conical lever $g$ upward through said slot $f^2$. The rear end of lever $e$ connects, by means of a link or pitman, $e'$, with the lever $e^2$, which operates the dropping-slide. The necessary oscillating motion is imparted by the to-and-fro movement of the lever $g$. The lever $g$ is moved to and fro by the knots $b'$ on the cord $b$. The point $g'$ swings far enough laterally to throw the alternate knots on opposite sides of the lever $g$. The knot bears against the edge and throws the rear end of the lever $g$ to the opposite side of the central line. The next knot throws the lever back, and so on.

The lever $g$ may be made nearly straight and have a bell-shaped end, $g^2$, as shown more clearly in Fig. 4. The gradually-diverging sides of the lever $g$ give to the slide a gradual movement.

The attachment $c$ is fixed at the center of the frame of the planter. The cord $b$ passes between the horses and over a guide-pulley, $a'$, fixed at or near the point of the tongue $a^2$ or at any other suitable point thereon. The cord $b$ passes through the attachment $c$, and thence is carried diagonally over the planter-frame to a pulley fixed on a pulley-bar, $h$, hinged to the center of the rear beam, $a^3$, of said frame $a$.

The pulley-bar $h$ is provided with a suitable clevis and swivel connection $h^4$ $h^5$, so that when attached it may have its outer end turned from one side to the other of the frame $a$. On the outer end of the pulley-bar I place the pulley $h^2$, which is held in a frame, $h^3$, which is hinged to the said bar so that it can be turned forward or back, as may be desired. The pulley-bar is held in place when the machine is in operation by the hooks or stirrups $a^4$ $a^4$. The bar $h$ is made long enough so that the pulley $h^2$ on its outer end will be outward from the frame $a$ a suitable distance to lay the rope $b$ on the line over which the center of the machine will pass in its return across the field. This brings the dropping devices always into their proper position to drop the rows at equal distance apart.

The operation of the device is very simple and easy, and will be clearly understood by reference to the drawings and the hereinbefore description.

In the manufacture of check-row corn-planters it is not new to have a single mechanism fixed at the center of the planter-frame, which, with a knotted cord extended longitudinally over the machine, operates the dropping mechanism. Nor is it new to employ a conical-shaped lever pivoted to swing to and fro, the inclined sides of which serve as cams which act in conjunction with the knotted cord to give motion to the dropping-slides.

Having thus described my invention, what I claim, and desire to secure by Letters Patent, is—

The improved attachment for check-row planters, composed of the base-plate $c'$, the cam $g$, having its pointed end pivoted near the forward end of the base-plate, the rollers $d$ $d$, placed opposite to each other on the rear end of the base-plate, the bar $e$, held by and turning on a pin, $d^3$, arranged in rear of and in line with the pivotal center $f^3$, and having its forward end pivoted to the cam $g$ and its rear end extended and adapted to operate the dropping-slide and with the knotted cord, substantially as and for the purposes set forth.

In testimony that I claim the foregoing I have hereunto set my hand this 3d day of April, 1880.

BENJAMIN F. BURTNER.

Witnesses:
O. H. SLOAN,
JOHN U. OUTCETT.